3,264,343
POLYNITROESTERS OF ETHYLENICALLY
UNSATURATED CARBOXYLIC ACIDS
Gustave B. Linden, Short Hills, N.J., assignor to Aerojet-General Corporation, Azusa, Calif., a corporation of Ohio
No Drawing. Filed Apr. 9, 1962, Ser. No. 186,273
4 Claims. (Cl. 260—486)

This invention relates to novel high energy polynitro esters of ethylenically unsaturated carboxylic acids, and to their method of preparation.

It is an object of this invention to prepare new energetic polynitro compounds. Another object of this invention is to prepare new ethylenically unsaturated polynitro compounds which can be readily polymerized with themselves or with other ethylenically unsaturated comonomers to form polymeric binders suitable for use in high energy fuel compositions. These and other objects of my invention will appear hereinafter.

The new polynitro esters of this invention have the following general formula:

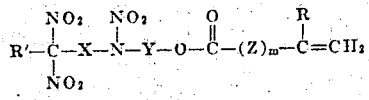

wherein R is selected from the group consisting of hydrogen and lower alkyl, i.e., methyl, pentyl, decyl, etc., R' is a lower alkyl or lower nitroalkyl group containing from 1 to about 10 carbon atoms, such as methyl, ethyl, decyl, tertiary butyl, 2-nitropropyl or 2,4-dinitropentyl; X, Y and Z are lower alkylene radicals such as ethylene, pentamethylene, and decamethylene; and m is zero or 1. The groups R, R', X, Y and Z may be branched or straight chain. These new compounds are prepared in accordance with the following general reaction:

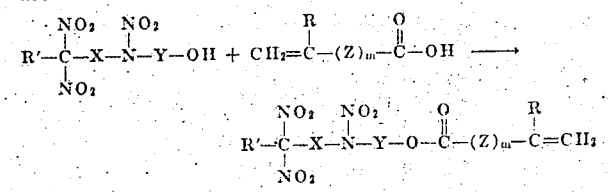

wherein R, R', X, Y, Z and m are as defined above.

This reaction is preferably, although not necessarily, conducted in the presence of an acid catalyst such as trifluoroacetic anhydride or polyphosphoric acid. The reaction temperature is not critical. Normally the reaction is run at a temperature between about −20° C. and about 100° C. The preferred temperature is from about 20° C. to about 50° C. The proportions of the acid and polynitroalcohol employed in the above reaction may be varied over a wide range. Preferably, however, the ethylenically unsaturated carboxylic acid is used in stoichiometric excess since this has been found to accelerate the rate of formation of the desired ester.

The reaction may be carried out under any pressure. Under normal circumstances it is most expedient to carry out the reaction at atmospheric pressure. The reaction may be run in the presence or in the absence of inert solvents. For example the reaction may be carried out in the presence of water, if desired.

It is sometimes desirable that the reaction mixture be agitated, such as by a mechanical stirrer, so as to aid in the formation of the ester by improving the contact between the reactants. The esters of this invention are normally solids and may be isolated in conventional manner by filtration, crystallization, and/or evaporation.

Since the acid reactants of this invention contain ethylenic unsaturation it is preferred that the esterification be carried out in the presence of an effective amount; i.e., from about .05% to about 3% by weight of reactants; of a polymerization inhibitor such as hydroquinone.

To more clearly illustrate my invention the following examples are presented. It is to be understood however that these examples are intended merely as illustrative embodiments of the invention and should not be construed as limitative of the scope of said invention in any way. In the examples percentages are by weight unless otherwise indicated.

*Example I.—Preparation of 3,5,5-trinitro-3-aza-1-hexyl acrylate*

At room temperature 0.022 mole of 3,5,5-trinitro-3-aza-1-hexanol (this compound may be prepared by the method disclosed in U.S. Patent No. 3,000,957, issued September 19, 1961) was added to a mixture of 0.026 mole of trifluoroacetic anhydride and 0.039 mole of redistilled acrylic acid, containing a small amount of hydroquinone. The reaction was mildly exothermic. The mixture became homogeneous on heating to 35° C. It was held at 35 to 40° C. for 45 minutes and left overnight in a cold container at −5° C. On dilution with water an oil was produced. This was taken up in methylene chloride, washed twice with water, and dried. The product was recrystallized twice from methanol to give a 62 percent yield of 3,5,5-trinitro-3-aza-1-hexyl acrylate, in the form of colorless plates having a melting point of 56–57° C.

*Analysis.*—Calc'd for $C_8H_{12}N_4O_8$: percent C, 32.88; percent H, 4.14; percent N, 19.17. Found: percent C, 33.10; percent H, 4.19; percent N, 19.19.

When Example I is repeated using 4,7,7-trinitro-4-aza-octanol, or 3,5,5,7,7,9,9-heptanitro-3-aza-1-decanol in place of 3,5,5-trinitro-3-aza-1-hexanol; and methacrylic acid in place of acrylic acid, 4,7,7-trinitro-4-aza-octyl methacrylate and 3,5,5,7,7,9,9-heptanitro-3-aza-1-decyl methacrylate, respectively, are obtained.

*Example II.—Preparation of 3,5,5-trinitro-3-aza-1-hexyl pentenoate*

3,5,5-trinitro-3-aza-1-hexyl pentenoate is prepared by the method of the above example by reacting 3,5,5-trinitro-3-aza-1-hexanol with redistilled pentenoic acid containing a small amount of hydroquinone. The ester is obtained in good yield.

*Example III.—Preparation of 4,7,7-trinitro-4-aza-octyl-α-ethyl acrylate*

One mole of α-ethyl acrylic acid is reacted with one-half mole of 4,7,7-trinitro-4-aza-octanol in the presence of trifluoroacetic anhydride. The reaction is carried out for about one hour at 35–50° C. to give 4,7,7-trinitro-4-aza-octyl α-ethyl acrylate.

The novel esters of this invention are inherently useful as explosives due to the presence of a plurality of high energy nitro groups in the molecule. These esters may also be homopolymerized or copolymerized to form high molecular weight polymers useful as binders in solid rocket propellants. Binders possessing superior physical properties are obtained by copolymerizing the esters of this invention with a comonomer containing a plurality of ethylenically unsaturated groups. Typical of such a comonomer is ethylene glycol diacrylate.

It will be understood that various modifications may be made in this invention without departing from the spirit thereof or the scope of the appended claims.

I claim:
1. As a composition of matter, compounds having the formula:

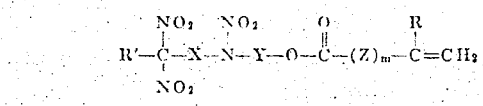

wherein R is selected from the group consisting of hydrogen and lower alkyl, R' is selected from the group consisting of lower alkyl and lower nitroalkyl, X, Y and Z are lower alkylene radicals, and $m$ is selected from the group consisting of 0 and 1.

2. The compounds of claim 1 wherein R is hydrogen.
3. The compounds of claim 1 wherein R is methyl.
4. The compound 3,5,5-trinitro-3-aza-1-hexyl acrylate.

References Cited by the Examiner

UNITED STATES PATENTS

| | | | |
|---|---|---|---|
| 2,967,195 | 1/1961 | Gold | 260—486 |
| 2,978,476 | 4/1961 | Klager | 260—534 X |
| 2,978,483 | 4/1961 | Vanneman | 260—534 X |
| 2,978,497 | 4/1961 | Frankel et al. | 260—534 X |
| 3,000,935 | 9/1961 | Vanneman | 260—534 |
| 3,025,318 | 3/1962 | Van Dolah | 260—586 |

LORRAINE A. WEINBERGER, *Primary Examiner.*

LEON ZITVER, *Examiner.*

D. P. CLARKE, A. P. HALLUIN, *Assistant Examiners.*